US006216072B1

(12) United States Patent
Boe et al.

(10) Patent No.: US 6,216,072 B1
(45) Date of Patent: Apr. 10, 2001

(54) HITCH CONTROL SYSTEM WITH ADJUSTABLE SLIP RESPONSE

(75) Inventors: Thomas Eugene Boe; Mark Allen Bergene, both of Cedar Falls, IA (US); Richard James Livdahl, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/447,360

(22) Filed: Nov. 23, 1999

(51) Int. Cl.[7] .......................... A01B 63/112; B60K 28/16
(52) U.S. Cl. .............................. 701/50; 180/197; 172/10
(58) Field of Search .................. 701/50, 71, 82, 701/89, 70, 90; 172/3, 7, 9, 10, 2, 8; 180/197

(56) References Cited

U.S. PATENT DOCUMENTS

| 3,913,680 | * | 10/1975 | Carlson ..................................... 172/2 |
| 4,465,142 | * | 8/1984 | Van Der Lely et al. ................. 172/7 |
| 4,508,176 | | 4/1985 | Wiegardt et al. ......................... 172/7 |
| 4,518,044 | | 5/1985 | Wiegardt et al. ......................... 172/7 |
| 4,809,785 | * | 3/1989 | Arnold et al. ............................ 172/9 |
| 4,886,123 | * | 12/1989 | Arnold et al. ............................ 172/7 |
| 4,969,527 | | 11/1990 | Boe et al. ................................ 172/7 |
| 4,979,092 | | 12/1990 | Bergene et al. ..................... 364/148 |
| 5,190,111 | | 3/1993 | Young et al. ............................. 172/7 |
| 5,320,186 | * | 6/1994 | Strosser et al. .......................... 172/8 |
| 5,443,307 | * | 8/1995 | Maier .................................... 303/169 |
| 5,560,431 | * | 10/1996 | Stratton ................................... 172/2 |
| 5,755,291 | | 5/1998 | Orbach et al. ........................... 172/2 |
| 5,911,769 | | 6/1999 | Orbach et al. ......................... 701/50 |
| 6,058,342 | * | 5/2000 | Orbach et al. ......................... 701/50 |

OTHER PUBLICATIONS

Case IH, "Operator's Manual Tractors Models 8910–8920", Published Date Unknown, pp. 112–123.
John Deere, "Operator's Manual 8100, 8200, 8300 And 8400 Tractors", 1995, pp. 45–1 Through 45–5.
Ford New Holland, "66 To 106 PTO Hp PowerStar Tractors", 1991, pp. 10–17, 20–21.

* cited by examiner

Primary Examiner—Tan Nguyen
Assistant Examiner—Dalena Tran

(57) ABSTRACT

A vehicle/implement hitch control system is responsive to a wheel slip signal indicative of the slippage of the driven wheels of the vehicle. The control system generates an integrated slip signal using an integration function, generates a proportional slip signal using a proportional function, and generates a combined slip signal as a combination of the integrated slip signal and the proportional slip signal. An operator-controllable slip response adjuster generates slip response signals. A hitch control signal is generated as a function of the slip response signal and the combined slip signal, so that the operator can vary the response of the hitch control signal to the integrated slip signal, to a mixture of the integrated slip signal, and to various multiples of the proportional slip signal only.

26 Claims, 2 Drawing Sheets

Microfiche Appendix Included
(1 Microfiche, 22 Pages)

HITCH CONTROL SYSTEM WITH ADJUSTABLE SLIP RESPONSE

BACKGROUND OF THE INVENTION

This invention relates to a hitch control system, and in particular to a hitch control system which is responsive to wheel slip.

There are two basic types of known hitch control systems which respond to sensed wheel slip. A system of the first type is described in U.S. Pat. No. 4,518,044, issued May 21, 1985 to Wiegardt et al., and assigned to the assignee of this application. In this system the hitch control signal includes an offset which is proportional to the amount of slip error (defined by difference between desired slip and actual slip)—the hitch control signal is an arithmetic combination of wheel slip error with other error signals such as draft force error and/or position error. The system described in the '044 patent includes an activity control for adjusting a gain value which multiplies not only slip error, but the combination of slip error, draft force error, engine speed error and position error. The system described in the '044 patent also includes an operator-controlled, rate-selecting switch for selecting slow and rapid rates of implement movement.

A system of the second type is described in U.S. Pat. No. 5,911,769, issued Jun. 15, 1999 to Orbach et al. The system of the '769 patent generates a slip signal based upon the apparent speed and the ground speed, and has a first operational mode which is operative when the slip signal is below a slip limit and second operational mode which is operational when the slip signal is above the slip limit. In the first mode, the system generates a hitch actuator control signal based upon the difference between the first or second operating parameter (draft force or position) and a reference value. In the second mode, the system can override control based on this difference by using a control signal based upon the difference between the slip signal and a slip reference value. The '769 system also includes a three-position rocker switch movable between OFF, ON and SET positions and which is used for turning a slip control function on and off and for setting a slip limit value.

Both types of system operate satisfactorily in high slip conditions, or when minimum depth variation is desired. However, when operating in light soils in rolling terrain, such systems may not control depth with sufficient accuracy, and they may operate too aggressively and cause overshoot of the hitch. Neither of these systems has an operator control solely for adjustment of the slip response of the system.

SUMMARY OF THE INVENTION

An object of the present invention is to provide a slip-responsive hitch control system which functions properly when operating in light soils in rolling terrain.

Another object of the present invention is to provide such a slip-responsive hitch control system which accurately controls depth.

Another object of the present invention is to provide such a hitch control system which does not operate too aggressively and which does not cause overshoot of the hitch.

Another object of the present invention is to provide such a hitch control system which includes an operator control for adjusting only the slip response of the system, apart from the responsiveness of other parameters.

These and other objects are achieved by the present invention wherein a hitch control system provides the operator with the ability to select the type of slip control function based on field conditions and implement type. When operating in light soils in rolling terrain the operator can select a slow acting slip integration control mode wherein the slip responsiveness of the hitch control system is purely a function of an integrated wheel slip signal. A slip response control permits the operator to adjust the control system from a pure integration control mode, though a mix mode to a proportional control mode. As the slip response control is adjusted toward the proportional end of its range, the slip responsiveness of the hitch control system is a function of both an integral of sensed wheel slip, together with a term which is proportional to sensed wheel slip. When the slip response control is adjusted fully to the proportional end of its range, the slip responsiveness of the hitch control system is a function only of the term which is proportional to sensed wheel slip, and is not a function of integrated wheel slip. This slip responsive hitch control system does not require an operator control for setting an adjustable slip set point, and thus, a desired slip responsiveness can be achieved with only the operator adjustable slip response control.

DESCRIPTION OF THE PREFERRED EMBODIMENT

This application includes a microfiche appendix including one microfiche and 22 frames.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

Figure 1:
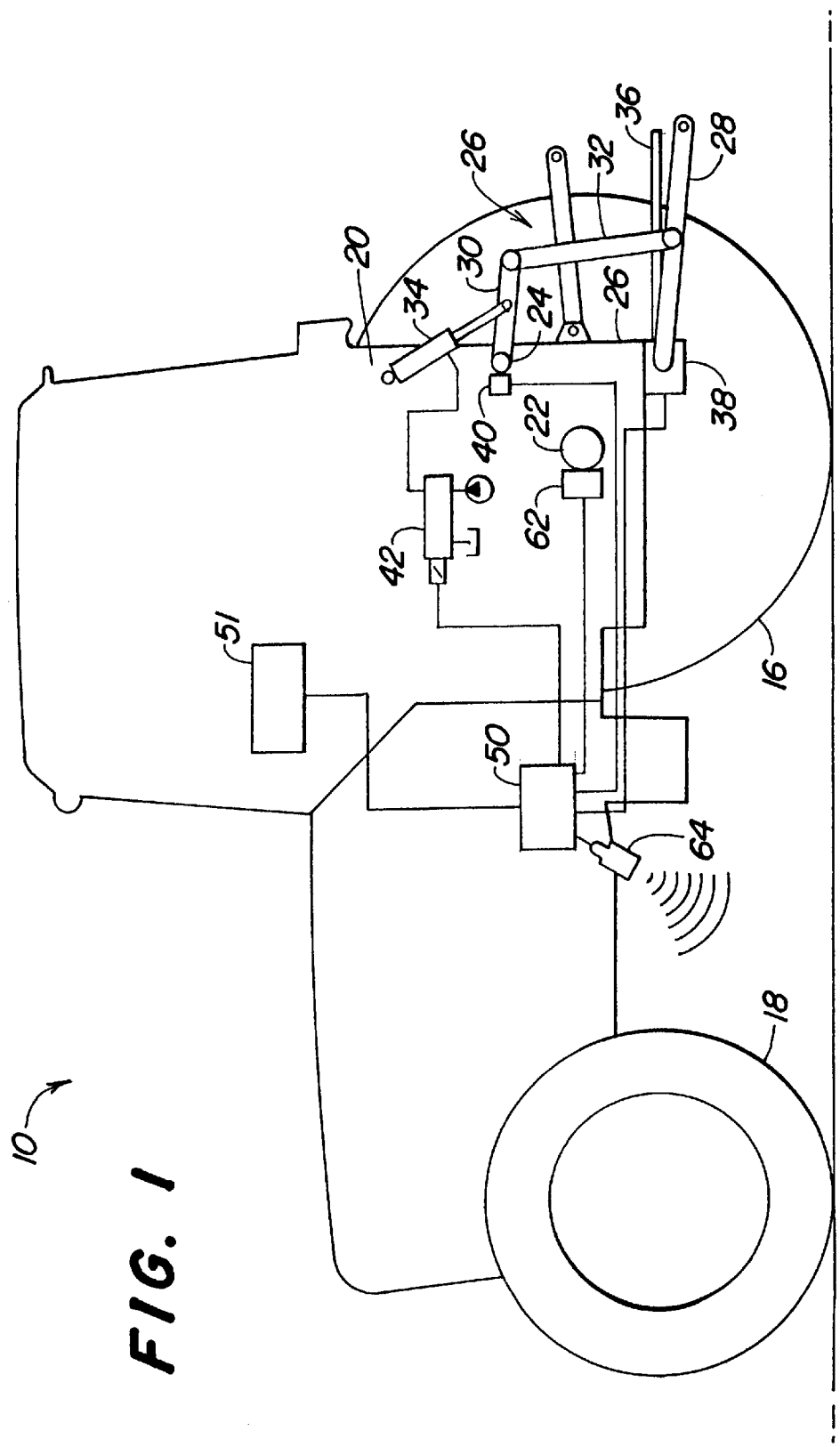
FIG. 1 is a simplified schematic of an agricultural tractor equipped with a hitch control system of the present invention.

As best seen in FIG. 1, a tractor 10 includes a pair of driven wheels 16 and a pair of non-driven wheels 18. A rear housing 20 supports a rear axle 22 and a rockshaft 24. An implement hitch 26, such as a conventional 3-point hitch, includes draft links 28 which are connected to lift arms 30 via lift links 32. The lift arms 30 are connected to the rockshaft 24 to insure simultaneous and equal movement and are raised and lowered via a pair of parallel connected hydraulic lift or rockshaft cylinders 34. A drawbar 36 extends rearwardly from the housing 20. The tractor 10 and the hitch 26 are merely exemplary and those skilled in the art will understand that the invention can be applied to tractors and hitches of other configurations. For example, this invention can be used on an articulated four-wheel drive tractor or on a front-wheel drive row-crop tractor, or on a tracked tractor.

An integral-type, ground-engaging implement (not shown), such as a moldboard plow or a chisel plow, may be attached in a conventional manner to the draft links 28. A draft sensor 38, preferably such as used on production John Deere 7000 Series tractors, and as described in U.S. Pat. No. 5,109,707, issued May 5, 1992 and assigned to the assignee of this application, is used to sense the draft forces transmitted to the draft links 28 from an attached implement. But, any suitable known draft sensor would suffice. A position sensor 40, preferably such as used on production John Deere 7000 Series tractors, is used to sense the position of the hitch 26.

The communication of hydraulic fluid to and from the cylinders 34 or to and from a remote cylinder (not shown) on a towed or semi-integral implement is controlled by a conventional solenoid-operated electrohydraulic flow control valve 42 which receives electrical control signals generated by a hitch electronic control unit (ECU) 50, which preferably includes a digital microprocessor, analog-to-digital converters, multiplexers and/or other equivalent conventional hardware components. The flow control valve 42 may be comprised of a commercially available servo-valve. The output hydraulic flow rate is substantially proportional to the magnitude of the electrical current applied to the torque motor of the valve 42. The hitch ECU 50 is also connected to various operator controls 51.

Figure 2:
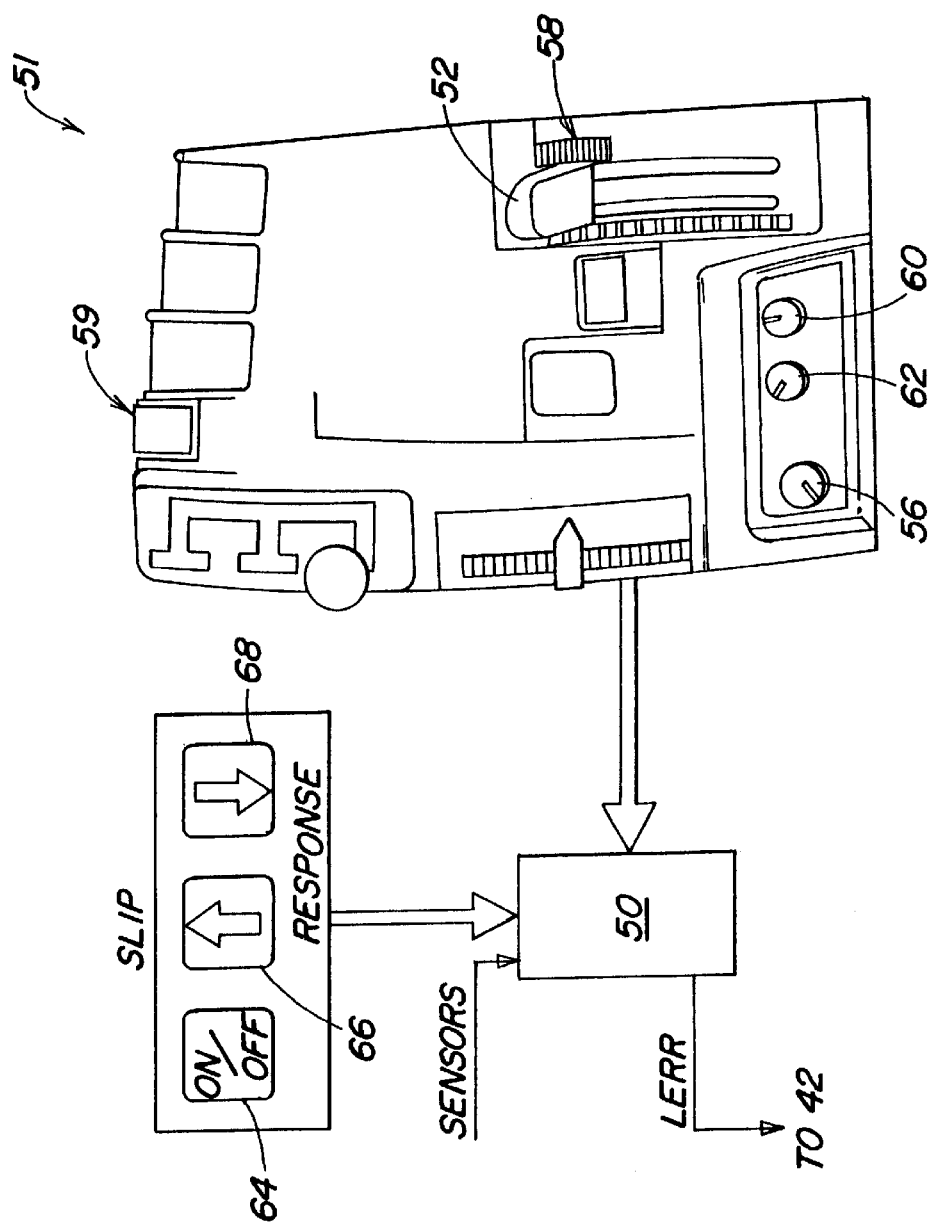
FIG. 2 shows the hitch-related operator controls which are used in connection with the hitch control system of FIG. 1.

As best seen in FIG. 2, the hitch-related operator controls 51 include a hitch control lever or load command 52 which is coupled to a position transducer (not shown, such as potentiometer) which generates a lever command signal which represents a desired draft force hitch or implement position, or a mix thereof, depending upon the setting of a load/depth control knob 56. Stop 58 provides an adjustable hitch control lever stop. The mechanism including lever 52 and stop 58 is described in detail in U.S. Pat. No. 5,231,892, issued Aug.3, 1993, and assigned to the assignee of this application. A raise/lower rocker switch 59 may be used to manually raise or lower the hitch 26. A rate of drop control 60 allows an operator to control the drop rate of the hitch 26. A height limit control 62 allows the operator to set an upper position limit for the hitch 26. As described up to this point, the operator controls are the same as those found on production John Deere 8000 tractors.

Referring again to FIG. 1, a position transducer 40, such as conventional rotary potentiometer, generates a sensed position signal which represents the actual sensed position of the hitch 26. A position feedback signal could also be obtained from the lift cylinder 34 or from a remote lift cylinder if that cylinder includes a position transducer, such as described in U.S. Pat. No. 3,726,191, for example. A conventional rotation speed sensor 62, such as a Motorola magnetic pickup, generates a wheel speed signal which represents the rotation speed of the rear axle 22 and the driven wheels 16. In the case of the magnetic pickup, a signal is generated with a frequency proportional to the wheel speed. A ground speed sensor 64, such as a commercially available doppler radar-type unit, generates a ground speed signal which represents the actual ground speed of the tractor 10. The radar ground speed signal also has a frequency proportional to the ground speed of the vehicle. As an alternative, a fifth wheel or a rotation speed sensor for a non-driven wheel could also be used for this purpose. Suitable conversion factors may be applied by the central processing unit 50 to these speed signals to convert them to comparable units.

According to the present invention, and referring again to FIG. 2, the operator controls 51 also includes a set of slip control-related touch pad switches, including an ON/OFF switch 64, a slip-response increase switch 66 and a slip-response decrease switch 68. Preferably, switches 66 and 68 can be used to vary slip-responsiveness on a one to ten scale.

The ECU 50 periodically (every 10 milliseconds for example) executes an algorithm represented by the computer program listing included in the microfiche appendix. As a result of periodically executing this algorithm, the ECU 50 generates a load (draft) error signal, LERR, which is communicated to the hitch control valve 42. In response to the LERR signal, the hitch control valve 42 and the cylinder 34 raises and lowers the hitch 26. The ECU 50 generates the LERR signal according to the following equation:

$$LERR=[\{(DRAFT-LCOM)*SENS*8+(FDBK-SPOS)/16 +SLPERR12\}*GAIN]*G18,$$

In this equation, DRAFT is a sensed draft force value from sensor 38. LCOM is a commanded load (draft) value from the operator control 52. SENS is a sensitivity setting value based on the draft/position mix control 56. FDBK is the hitch position feedback from hitch position sensor 40. SPOS is a desired hitch position value based on the operator control lever 52. SLPERR12 is a combined slip error value (described later). GAIN is a draft loop gain value based on the setting of the draft/position mix control 56. G18 is a bi-directional valve gain value which is used to normalize the equation for varying lift cylinder volumes. The constants 8 and 16 are normalization factors which maintain precision as the ECU 50 performs integer arithmetic.

The terms GAIN and G18 allow an adjustment in the rate of response. These terms provide more or less valve command (or flow) for a given difference between the sensed draft force, DRAFT, and sensed position, FDBK, as compared to the draft command value, LCOM, and position command value, SPOS.

The ECU 50 generates the combined slip error value, SLPERR12 according to the following equation:

$$SLPERR12=SLPERR+SLPGN1*(SLIP-SLIPSET),$$

In this equation SLPERR is an integrated slip error value. SLPGN1 is a proportional slip error gain term, SLIP is the measured slip in percent, and SLIPSET is a slip set point in percent. The SLPERR12 value is preferably limited to positive values only. The slip set point (SLIPSET) may be fixed at a value of 10 percent, for example, for wheeled tractors, and can be fixed at a different value, such as between 5 percent for tracked vehicles.

The integrated slip error, SLPERR, is determined by repetitive operation of the following integration function:

If (SLIP>SLIPSET)
   Then SLPERR=SLPERR+SLPADDR+SLPAG* (SLIP−SLIPSET)/256
   Else SLPERR=SLPERR−SLPDRN−SLPDG* (SLIPSET−SLIP)/256

In this function, SLPADDR is an integration adder value, SLPDRN is an integration drain value, SLPAG is an adder gain value, SLPDG is a drain gain value and SLIP, SLIPSET and SLPERR are as previously defined. The constant 256 is used to allow fractional representation when doing integer arithmetic. SLPERR is also preferably limited to positive values only.

As mentioned previously, the slip-related touch pad switches 64, 66 and 68 can be used to vary slip-responsiveness on a scale of one to ten. This slip-responsiveness term allows a single operator control to set values of slip adder/drain and slip gain terms for both the integration portion and the proportional portion of the slip equation.

The following table shows the values for each setting of slip-responsiveness.

| Slip-Responsiveness SLPCNTL | SLPCNTL *5 | SLPAG | | | |
|---|---|---|---|---|---|
| | | SLPADDR | SLPDG | SLPDRN | SLPGN1 |
| 1 | 5 | 5 | 25 | 10 | 0 |
| 2 | 10 | 10 | 25 | 20 | 0 |
| 3 | 15 | 15 | 25 | 30 | 0 |
| 4 | 20 | 15 | 0 | 30 | 10 |
| 5 | 25 | 10 | 0 | 20 | 20 |
| 6 | 30 | 5 | 0 | 10 | 30 |
| 7 | 35 | 0 | 0 | 24 | 40 |
| 8 | 40 | 0 | 0 | 24 | 50 |
| 9 | 45 | 0 | 0 | 24 | 60 |
| 10 | 50 | 0 | 0 | 24 | 70 |

It should be noted that SLPCNTL*5 is used internally to calculate the remaining values in this table. It should also be noted that the slip drain (SLPDRN) is set to 24 when the adder (SLPADDR) is set to zero so that the integrator drains off when no longer required. At low values (1–2) of slip-responsiveness SLPCNTL (set by switches 66 and 68), which is best for hilly conditions, slip control is purely integral during which the slip error is integrated or accumulated. At high values of SLPCNTL, which is best for level terrain conditions, slip control is purely proportional and the slip error is not integrated or accumulated. At intermediate values of SLPCNTL, slip control is a combination of proportional and integral control.

The slip response adjusting touch pad switches 66 and 68 can be used to adjust the slip responsiveness of the hitch control system so that it is responsive a) to a combination of a proportional slip term and an integrated slip term, or b) to only an integrated slip term, or c) to only various multiples of a proportional slip term. Setting the slip error gain (SLPGN1) to zero will disable the proportional slip factor (SLIP–SSLIPSET) so that the control system will be responsive only to the integrated slip term. Adjusting the integration adder value (SLPADDR) to zero will disable the integration slip term. This allow the hitch to respond quickly to high slip condition when operating in wet or slick soil conditions. Thus, this slip responsive hitch control system compensates for high wheel slip conditions by moving the average position of the hitch 26 upward to adjust for digging down of the tires (not shown) or to decrease a commanded draft force value to accommodate the reduction in sensed draft force due to reduced tractor speed. It should be noted, that the integration drain which remains when the system is in its pure proportional mode is used to "drain off" or reduce the accumulated integrated slip, but since negative values of integrated slip are not allowed, there is not integration or accumulation of negative integrated slip.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:

a wheel slip generator for generating a sensed wheel slip signal indicative of a sensed amount of slippage of the driven wheel;

an integrated wheel slip generator for generating an integrated slip signal using an integration function operating upon the sensed wheel slip signal;

a proportional wheel slip generator for generating a proportional slip signal using a proportional function operating upon the sensed wheel slip signal;

an operator operable slip response adjuster for generating a slip response adjuster signal; and a hitch control signal generator for generating the hitch control signal as a function of the integrated slip signal, the proportional slip signal and the slip response adjustment signal, the hitch control signal generator, in response to the slip response adjuster signal, varying a response of the hitch control signal to the integrated slip signal and the proportional slip signal.

2. The hitch control system of claim 1, wherein:

the hitch control signal generator, in response to manipulation of the slip response adjuster, selectively adjusts a response of the hitch control signal so that the hitch control signal is a function of only the integrated slip signal, of only the proportional slip signal, or of a combination of the integrated slip and the proportional slip signals.

3. The hitch control system of claim 2, further comprising:

a draft force sensor for generating a draft force signal;

an operator-controlled command signal generator for generating a hitch command signal; and a hitch position sensor for generating a hitch position signal representing a position of the hitch, the hitch control system generating the hitch control signal as a function of the draft force signal, the hitch command signal, the hitch position signal and the combined slip signal.

4. The hitch control system of claim 1, wherein:

the proportional wheel slip generator generates the proportional slip signal by multiplying the sensed wheel slip signal by a slip gain value; and the slip gain value varies in response to manipulation of the slip response adjuster.

5. The hitch control system of claim 4, wherein:

the slip response adjuster can vary the slip gain value from zero to a value which provides quick response in slick soil conditions.

6. The hitch control system of claim 1, wherein:

the hitch control signal generator generates a combined slip signal which is an arithmetic sum of a) the integrated slip signal and b) the proportional slip signal multiplied by a slip gain value.

7. The hitch control system of claim 1, wherein the integrated wheel slip generator comprises:

an incrementor which increments the integrated wheel slip signal if the sensed wheel slip signal is larger than a certain amount; and a decrementor which decrements the integrated wheel slip signal if the sensed wheel slip signal is not larger than a certain amount.

8. The hitch control system of claim 7, wherein:

the incrementor varying its rate of increase of the integrated wheel slip signal in response to adjustment of the slip response adjuster, and the decrementor varying its rate of decrease of the integrated wheel slip signal in response to adjustment of the slip response adjuster.

9. The hitch control system of claim 8, wherein: the proportional wheel slip generator varies its slip gain value in response to adjustment of the slip response adjuster.

10. The hitch control system of claim 1, wherein: the sensed wheel slip signal is an error signal representing a difference between a sensed wheel slip and a predetermined slip setpoint value.

11. The hitch control system of claim 1, further comprising:
a combined slip generator for generating a combined slip signal as a combination of the integrated slip signal and the proportional slip signal, and the hitch control signal generator generating the hitch control signal as a function of the combined slip signal and the slip response adjuster signal.

12. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:
a wheel slip generator for generating a sensed wheel slip signal indicative of an amount of slippage of the driven wheel;
an integrated wheel slip generator for generating an integrated slip signal using an integration function operating upon the sensed wheel slip signal;
a proportional wheel slip generator for generating a proportional slip signal by multiplying the sensed wheel slip signal by a slip gain value;
a combined slip generator for generating a combined slip signal as a combination of the integrated slip signal and the proportional slip signal;
an operator-controllable slip response control device for varying the slip gain value; and
a hitch control signal generator for generating the hitch control signal as a function of the combined slip signal.

13. The hitch control system of claim 12, further comprising:
a draft force sensor for generating a draft force signal;
a command signal generator for generating a command signal representing a position of an operator-controlled command device; and
a hitch position sensor for generating a hitch position signal representing a position of the hitch, the hitch control system generating the hitch control signal as a function of the draft force signal, the command signal, the hitch position signal and the combined slip signal.

14. The hitch control system of claim 12, further comprising:
the operator-controllable slip response control device comprises a first switch for increasing the slip gain value and a second switch for decreasing the slip gain value.

15. The hitch control system of claim 14, wherein: the slip response control device can vary the slip gain value from zero to a positive value less than 1.

16. The hitch control system of claim 12, wherein: the combined slip signal is an arithmetic sum of a) the integrated slip signal and b) the proportional slip signal multiplied by the slip gain value.

17. The hitch control system of claim 12, wherein:
if the sensed wheel slip signal is greater than zero, the integrated wheel slip generator periodically increments the integrated slip signal; and
if the sensed wheel slip signal is not greater than zero, the integrated wheel slip generator periodically decrements the integrated slip signal.

18. The hitch control system of claim 17, wherein: the integrated wheel slip generator varies a rate of change of the integrated slip error signal in response to adjustment of the slip response control.

19. The hitch control system of claim 18, wherein: the proportional wheel slip generator varies the slip gain value in response to adjustment of the slip response control.

20. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:
a wheel slip generator for generating a sensed wheel slip signal indicative of a sensed amount of slippage of the driven wheel;
an integrated wheel slip generator for generating an integrated slip signal using an integration function operating upon the sensed wheel slip signal;
a proportional wheel slip generator for generating a proportional slip signal by multiplying the sensed wheel slip signal by a slip gain value;
a combined slip generator for generating a combined slip signal as a combination of the integrated slip signal and the proportional slip signal; and
a hitch control signal generator for generating the hitch control signal as a function of the combined slip signal.

21. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:
a wheel slip generator for generating a sensed wheel slip signal indicative of a sensed amount of slippage of the driven wheel;
an integrated wheel slip generator for generating an integrated slip signal using an integration function operating upon the sensed wheel slip signal;
a proportional wheel slip generator for generating a proportional slip signal using a proportional function operating upon the sensed wheel slip signal;
an operator operable slip response adjuster for generating a slip response adjustment signal; and
a hitch control signal generator for generating the hitch control signal as a function of the integrated slip signal, the proportional slip signal and the slip response adjustment signal, the hitch control signal generator, in response to the slip response adjuster, adjusting a response of the hitch control signal so that the hitch control signal is a function of only the integrated slip signal, or is a function of only the proportional slip signal, or is a function of a combination of the integrated slip and the proportional slip signals.

22. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:

a wheel slip generator for generating a sensed wheel slip signal indicative of a sensed amount of slippage of the driven wheel;

an integrated wheel slip generator for generating an integrated slip signal using an integration function operating upon the sensed wheel slip signal;

a proportional wheel slip generator for generating a proportional slip signal using a proportional function operating upon the sensed wheel slip signal;

an operator operable slip response adjuster for generating a slip response adjuster signal; and a hitch control signal generator for generating the hitch control signal as a function of the integrated slip signal, the proportional slip signal and the slip response adjustment signal, the hitch control signal generator, in response to the slip response adjuster signal, varying a response of the hitch control signal to the integrated slip signal and the proportional slip signal, the sensed wheel slip signal being generated by subtracting a wheel slip set point value from a sensed wheel slip value, and the integrated wheel slip generator incrementing the integrated wheel slip signal if the sensed wheel slip value is greater than the wheel slip set point value.

23. The hitch control system of claim 22, wherein:

the integrated wheel slip generator varies its rate of increase of the integrated wheel slip signal in response to adjustment of the slip response adjuster.

24. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:

a wheel slip generator for generating a sensed wheel slip signal indicative of a sensed amount of slippage of the driven wheel;

an integrated wheel slip generator for generating an integrated slip signal using an integration function operating upon the sensed wheel slip signal;

a proportional wheel slip generator for generating a proportional slip signal using a proportional function operating upon the sensed wheel slip signal;

an operator operable slip response adjuster for generating a slip response adjuster signal; and a hitch control signal generator for generating the hitch control signal as a function of the integrated slip signal, the proportional slip signal and the slip response adjustment signal, the hitch control signal generator, in response to the slip response adjuster signal, varying a response of the hitch control signal to the integrated slip signal and the proportional slip signal, the sensed wheel slip signal being generated by subtracting a wheel slip set point value from a sensed wheel slip value, and the integrated wheel slip generator decrementing the integrated wheel slip signal if the sensed wheel slip signal is not greater than the wheel slip set point value.

25. The hitch control system of claim 24, wherein:

the integrated wheel slip generator varies its rate of decrease of the integrated wheel slip signal in response to adjustment of the slip response adjuster.

26. In a vehicle having a driven wheel, a hitch for attaching a ground-penetrating implement thereto, an actuator for raising and lowering the hitch to vary the ground penetration thereof in response to a hitch control signal applied to an input thereof, and a hitch control system for generating the hitch control signal as a function of sensed parameters and operator controls, the hitch control system comprising:

a wheel slip generator for generating a sensed wheel slip signal indicative of an amount of slippage of the driven wheel;

an integrated wheel slip generator for generating an integrated slip signal using an integration function operating upon the sensed wheel slip signal;

a proportional wheel slip generator for generating a proportional slip signal by multiplying the sensed wheel slip signal by a slip gain value;

a combined slip generator for generating a combined slip signal as a combination of the integrated slip signal and the proportional slip signal;

an operator-controllable slip response control device for varying the slip gain value; and a hitch control signal generator for generating the hitch control signal as a function of the combined slip signal, wherein, if the sensed wheel slip signal is greater than zero, the integrated slip, SLPERR, is determined by the following function:

$$SLPERR=SLPERR+SLPADDR+SLPAG*(SLIP-SLIPSET)/CONSTANT,\text{ and}$$

if the sensed wheel slip signal is not greater than zero the integrated slip signal, SLPERR, is determined by the following function $$SLPERR=SLPERR-SLPDRN-SLPDG*(SLIPSET-SLIP)/CONSTANT,$$

where SLPADDR is an integration adder value, SLPDRN is an integration drain value, SLPAG is an adder gain value, SLPDG is a drain gain value, SLIP is a sensed wheel slip value, and SLIPSET is a wheel slip set point.

* * * * *